United States Patent
Bonmartin et al.

[11] Patent Number: 5,924,743
[45] Date of Patent: Jul. 20, 1999

[54] DEVICE ADAPTED TO BE FIXED AND SEALED TO AT LEAST ONE CYLINDRICAL MEMBER

[75] Inventors: Michel Bonmartin, Clamart; Bruno Veyrat, Vezeronce Curtin; Yann Wolff, Morestel; Christian Bonnand, Bachy, all of France

[73] Assignees: Gec Alsthom Stein Industrie, Velizy-Villcoublay; Central Nuclearie Europeene; Electricite De France, both of Paris, all of France

[21] Appl. No.: 08/809,115
[22] PCT Filed: Jul. 18, 1996
[86] PCT No.: PCT/FR96/01128
  § 371 Date: Mar. 14, 1997
  § 102(e) Date: Mar. 14, 1997
[87] PCT Pub. No.: WO97/04268
  PCT Pub. Date: Feb. 6, 1997

[30] Foreign Application Priority Data

Jul. 19, 1995 [FR] France .................... 95 08731

[51] Int. Cl.⁶ .......................................... F16L 13/04
[52] U.S. Cl. ................. 285/15; 285/97; 285/96; 285/382; 285/382.4; 277/331
[58] Field of Search .................... 285/15, 382.4, 285/382.5, 96, 97, 100, 382; 138/97; 277/331, 334

[56] References Cited

U.S. PATENT DOCUMENTS

| | | | |
|---|---|---|---|
| 385,600 | 7/1888 | Durbrow | 277/331 |
| 2,061,993 | 11/1936 | Baker | 277/331 |
| 2,342,884 | 2/1944 | Moore | 277/331 |
| 2,943,684 | 7/1960 | Smith | 277/331 |
| 3,574,360 | 4/1971 | Grawey | 285/96 |
| 4,349,204 | 9/1982 | Malone | 277/334 |
| 4,582,551 | 4/1986 | Parkes et al. | 285/15 |
| 4,648,626 | 3/1987 | Vinciguerra et al. | 285/15 |
| 4,887,846 | 12/1989 | Chin et al. | 285/96 |
| 5,066,208 | 11/1991 | Warmerdam | 285/15 |
| 5,595,405 | 1/1997 | Knutsen | 285/96 |

FOREIGN PATENT DOCUMENTS

| | | |
|---|---|---|
| 654931 | 1/1963 | Canada .................. 285/96 |
| 0047407A1 | 3/1982 | European Pat. Off. . |
| 0181250A1 | 5/1986 | European Pat. Off. . |
| 0271739A1 | 6/1988 | European Pat. Off. . |
| 0626232A1 | 11/1994 | European Pat. Off. . |

Primary Examiner—Eric K. Nicholson
Attorney, Agent, or Firm—Sughrue, Mion, Zinn, Macpeak & Seas, PLLC

[57] ABSTRACT

The invention concerns a device adapted to be fixed and sealed to at least one cylindrical member (1, 1'), characterized in that it includes:

a first sleeve (2), a second sleeve (3) coaxial with the first sleeve (2) having a greater capacity for deformation than the first sleeve (2) and fixed and sealed to the first sleeve (2) at both ends, at least two cylindrical rings (4, 5) coaxial with the second sleeve (3), pressed against the latter and each fixed by one edge to one end of the second sleeve (3), and means (6, 6') for injecting a pressurized fluid between the first sleeve (2) and the second sleeve (3).

19 Claims, 3 Drawing Sheets

FIG.2
FIG.3
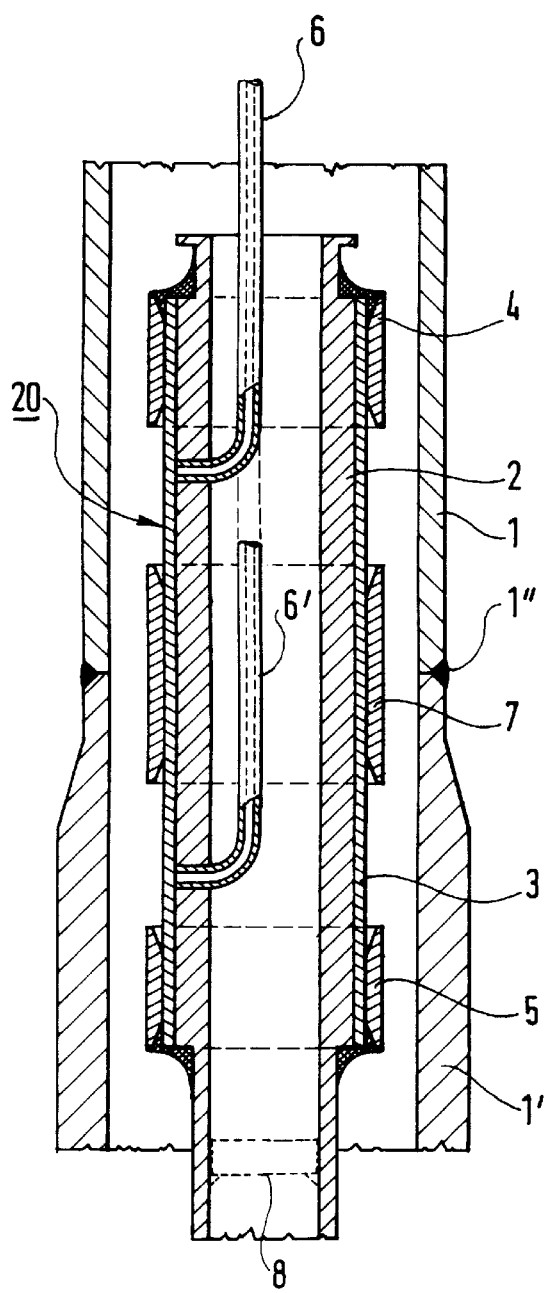
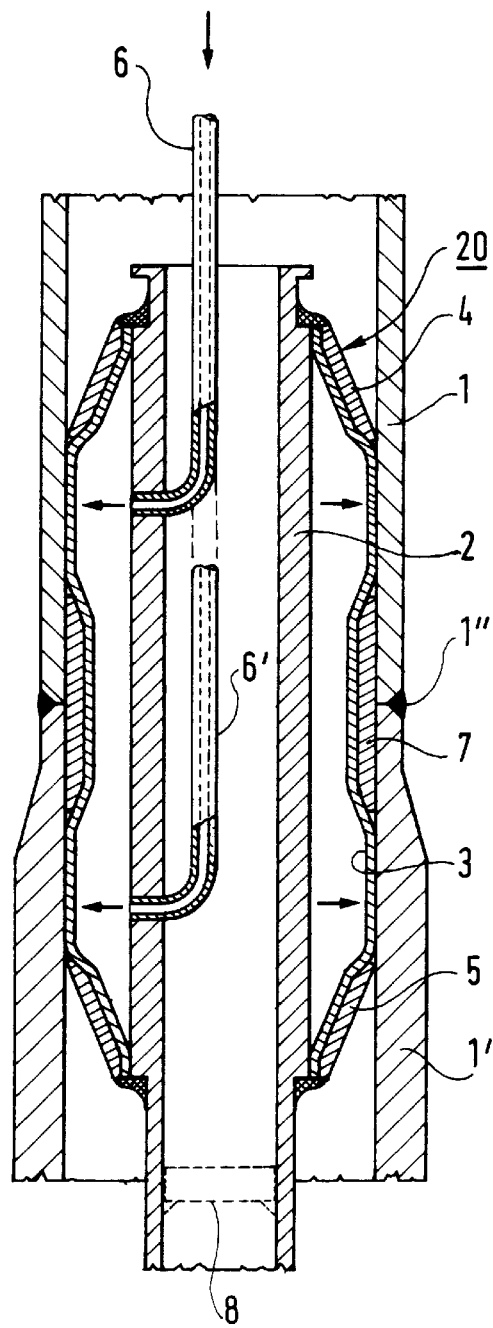

DEVICE ADAPTED TO BE FIXED AND SEALED TO AT LEAST ONE CYLINDRICAL MEMBER

The present invention concerns a device adapted to be fixed and sealed to at least one cylindrical member.

The device is preferably intended for working on an argon feed tube of a nuclear reactor heat exchanger at a distance of several meters from a slab and inaccessible for this reason.

Methods have previously been proposed for repairing a nuclear reactor heat exchanger tube in the vicinity of the tube plate of the heat exchanger. In prior art patent documents EP-0 271 739 and EP-0 181 250, a sleeve is inserted into the tube to be repaired and is expanded and then welded to it.

Methods like these require access to the working area.

The present invention proposes a device that can easily be installed remotely, by guiding it on the cylindrical member to be processed and then by expanding it by using a pressurized fluid.

The device comprises:

a first sleeve, a second sleeve coaxial with the first sleeve having a greater capacity for deformation than the first sleeve and fixed and sealed to the first sleeve at both ends, at least two cylindrical rings coaxial with the second sleeve, pressed against the latter and each fixed by one edge to one end of the second sleeve, and means for injecting a pressurized fluid between the first sleeve and the second sleeve.

It preferably includes at least a third ring pressed onto the second sleeve and disposed between the previous two rings.

In the preferred embodiment the rings have bevelled free edges on the side adjacent the second sleeve.

The sleeves and the rings are advantageously made of metal.

In this case the fixing is performed by welding and the sleeves and the rings are made of stainless steel.

The injection means are tubes discharging between the first sleeve and the second sleeve and connected to a pressurized fluid supply.

The pressurized fluid can be water at a controlled pressure between 1 200 bars and 1 600 bars.

In a first embodiment the device is adapted to be fixed to the interior of at least one tube and:

the first sleeve has an outside diameter less than the inside diameter of the tube, the second sleeve has an inside diameter substantially equal to the outside diameter of the first sleeve, the rings have an inside diameter substantially equal to the outside diameter of the second sleeve.

In a second embodiment, the device is adapted to be fixed to the exterior of at least one cylindrical member and:

the first sleeve has an inside diameter greater than the outside diameter of the cylindrical member, the second sleeve has an outside diameter substantially equal to the inside diameter of the first sleeve, and the rings have an outside diameter substantially equal to the inside diameter of the second sleeve.

The device can be used to connect two tubes end-to-end, as a device for repairing a damaged area of a tube or a device for closing off a tube.

In the latter case, the first sleeve includes a wall for closing off its internal space.

The invention is described in more detail below with reference to figures showing one preferred embodiment of the invention.

FIG. 2 is a view in longitudinal section of a first embodiment of the device of the invention before it is expanded.

FIG. 3 is a view in longitudinal section of a first embodiment of the device of the invention after it is expanded.

Figure 1:
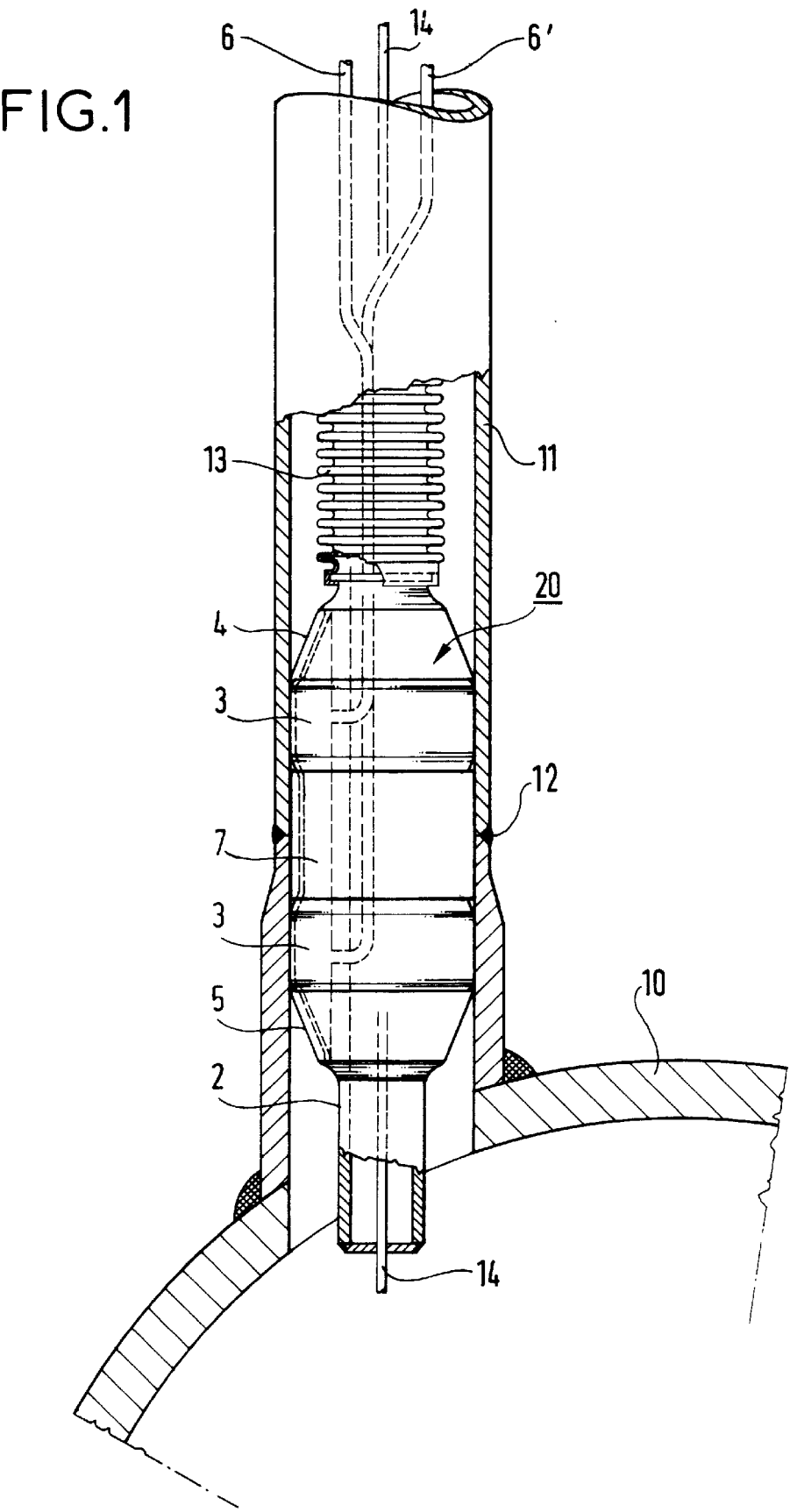
FIG. 1 is a part-sectional view of one particular application of the device of the invention.

FIG. 1 shows a nuclear reactor heat exchanger tube 10 equipped with an argon feed tube 11. Damage has been detected in the area 12 of the tube 11 and is causing a leak. The area 12 is inaccessible since it is several meters from the slab. The device 20 of the invention is slid along the interior of the tube 11 by pushing it with a corrugated tube 13 and is equipped with a detector arrangement, for example an optical fiber 14 connected to an endoscope or a video camera, enabling the fault in the area 12 to be identified and the device 20 to be positioned in the area 12.

FIGS. 2 and 3 show the device 20 of the invention in a more general way. Here it is intended to join two tubes 1, 1' end-to-end or to repair a faulty area 1", for example a weld, between the two tubes 1, 1'.

In the initial state, prior to expansion, it includes:

a first sleeve 2, a second sleeve 3 coaxial with the first sleeve 2 and having a greater capacity for deformation that the first sleeve 2, in the example shown by virtue of it being thinner than the first sleeve 2, and fixed and sealed to the first sleeve 2 at both ends, two preferably identical cylindrical rings 4, 5 coaxial with the second sleeve, pressed against the latter and each attached by one edge to one end of the second sleeve 3, a third ring 7 pressed against the second sleeve 3 between the previous two rings 4, 5.

A plurality of rings like the ring 7 can be disposed along the length of the second sleeve 3.

The first sleeve 2, the second sleeve 3 and the rings 4, 5, 7 are threaded one over the other, in other words, in this embodiment:

the first sleeve 2 has an outside diameter less than the inside diameter of the tubes 1, 1', the second sleeve 3 has an inside diameter substantially equal to the outside diameter of the first sleeve 2, and the rings 4, 5, 7 have an inside diameter substantially equal to the outside diameter of the second sleeve 3.

The rings 4, 5, 7 have bevelled free edges on the side facing the second sleeve 3.

Pipes 6, 6' constituting means for injecting a pressurized fluid discharge between the first and second sleeves 2, 3 and are connected to a supply of pressurized fluid.

In the particular application described above, the sleeves 2, 3 and the rings 4, 5, 7 are made of metal, preferably of stainless steel, and the fixing is carried out by welding. The pressurized fluid is water at a controlled pressure between 1 200 bars and 1 600 bars.

The pressure is controlled by monitoring the variation in pressure as a function of time, from which are deduced the steps of placement on the tubes 1, 1', elastic deformation and plastic deformation of the material of the device. This ensures optimal fixing to the tubes, sufficient to achieve a reliable seal, without exceeding the mechanical strength limits of the device.

On injecting the pressurized fluid the second sleeve is deformed as shown in FIG. 3 and pressed against the inside wall of the tubes 1, 1'. The bevelled edges of the rings 4, 5, 7 lodge in the wall of the tubes and so ensure a sealed and mechanically strong fixing of the device 20 to the tubes 1, 1'.

The device 20 is advantageously pre-expanded before it is inserted into a tubular containment tool having a diameter less than the inside diameter of the tubes 1, 1' which lock the central ring 7 in position. It is also heat treated to favour its capacity for deformation. The rings 4, 5, 7 can have a surface treatment, for example a coating of pure nickel, enhancing their deformation and caulking capability, the coating filling all of the interstices between the rings and any upstanding relief on the wall of the tubes 1, 1'. The second sleeve 3 can also be coated between the rings with an elastic coating, for example an elastomer, polyurethane or tetrafluoroethylene coating, for improved contact with the tubes 1, 1'.

The pressure of the fluid can be released or retained after fitting the device of the invention by expanding it, depending on the application.

By providing the first sleeve 2 with a wall 8 for closing off its interior space, the device can be used as a device for closing off a tube 1, 1'.

Figure 4:
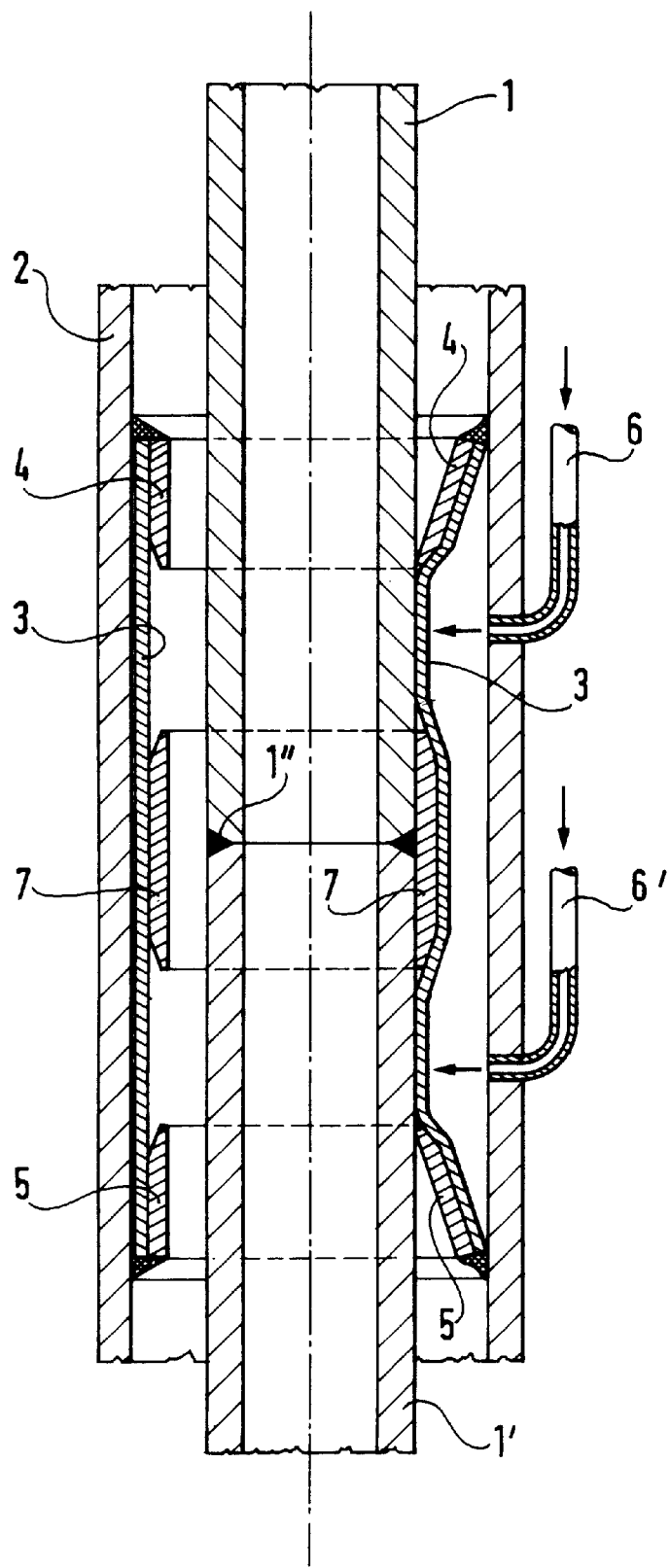
FIG. 4 is a view in longitudinal section of a second embodiment of the device of the invention before and after it is expanded.

The device of the invention can also be used as a tube connector or repair device, disposed outside the tubes as shown in FIG. 4.

In this case:
the first sleeve 2 has an inside diameter greater than the outside diameter of the cylindrical member 1, 1',
the second sleeve 3 has an outside diameter substantially equal to the inside diameter of the first sleeve 2,
the rings 4, 5, 7 have an outside diameter substantially equal to the inside diameter of the second sleeve 3.

The pressurized fluid is fed from outside the tubes 1, 1' via the pipes 6, 6'.

The device is shown in the initial state in the lefthand part of FIG. 4 and in the expanded state in the righthand part of FIG. 4.

All other technical features of the device and its use are identical to those of the previous embodiment.

In the preferred embodiment, the various components of the device are made of metal, preferably stainless steel. However, in applications where safety constraints are less demanding or in the case of non-metal tubes consideration may be given to using other materials in the device, for example plastics materials.

We claim:

1. Device adapted to be fixed and sealed to at least one cylindrical member (1, 1'), characterized in that it includes:
   a first sleeve (2),
   a second sleeve (3) coaxial with the first sleeve (2) having a greater capacity for deformation than the first sleeve (2) and fixed and sealed to the first sleeve (2) at both ends,
   at least two cylindrical rings (4, 5) coaxial with the second sleeve (3), pressed against the latter and each fixed by one edge to one end of the second sleeve (3), and
   means (6, 6') for injecting a pressurized fluid between the first sleeve (2) and the second sleeve (3) such that the entire length of said second sleeve, between the ends of the second sleeve, separates from said first sleeve without rupturing.

2. Device according to claim 1 characterized in that it includes at least one third ring (7) pressed onto the second sleeve (3) and disposed between the previous two rings (4, 5).

3. Device according to claim 1 characterized in that the rings (4, 5, 7) have bevelled free edges on the side facing the second sleeve (3).

4. Device according to claim 1 characterized in that the sleeves (2, 3) and the rings (4, 5, 7) are made of metal.

5. Device according to claim 4 characterized in that said second sleeve is fixed to said first sleeve by welding, and said rings are fixed to said second sleeve by welding.

6. Device according to claim 4 characterized in that the sleeves (2, 3) and the rings (4, 5, 7) are made of stainless steel.

7. Device according to claim 1 characterized in that the injection means comprise pipes (6, 6') discharging between the first sleeve (2) and the second sleeve (3) and connected to a pressurized fluid supply.

8. Device according to claim 1 characterized in that the pressurized fluid is water at a controlled pressure between 1 200 bars and 1 600 bars.

9. Device according to claim 1 adapted to be fixed to at least one tube (1, 1'), characterized in that:
   the first sleeve (2) has an outside diameter less than the inside diameter of the tube (1, 1'),
   the second sleeve (3) has an inside diameter substantially equal to the outside diameter of the first sleeve (2), and
   the rings (4, 5, 7) have an inside diameter substantially equal to the outside diameter of the second sleeve (3).

10. Device adapted to be fixed to at least one cylindrical member (1, 1'), characterized in that said device includes:
    a first sleeve (2),
    a second sleeve (3) coaxial with the first sleeve (2) having a greater capacity for deformation than the first sleeve (2) and fixed and sealed to the first sleeve (2) at both ends,
    at least two cylindrical rings (4, 5) coaxial with the second sleeve (3), pressed against the latter and each fixed by one edge to one end of the second sleeve (3), and
    means (6, 6') for injecting a pressurized fluid between the first sleeve (2) and the second sleeve (3); wherein
    the first sleeve (2) has an inside diameter greater than the outside diameter of the cylindrical member (1, 1'),
    the second sleeve (3) has an outside diameter substantially equal to the inside diameter of the first sleeve (2), and
    the rings (4, 5, 7) have an outside diameter substantially equal to the inside diameter of the second sleeve (3).

11. A method for joining two tubes (1, 1') end-to-end comprising:
    aligning tubes (1, 1') in an end-to-end relationship;
    inserting a device according to claim 1 into the tubes (1, 1') such that the two cylindrical rinds (4, 5) are in respective tubes (1, 1'); and
    injecting a pressurized fluid between the first sleeve (2) and the second sleeve (3).

12. A method for repairing a damaged area of a tube (1, 1') comprising:
    inserting a device as claimed in claim 1 into the tube (1, 1') such that the second sleeve (3) is adjacent the damaged area of tube (1, 1'); and
    infecting a pressurized fluid between the first sleeve (2) and the second sleeve (3).

13. Device according to claim 1, wherein the first sleeve (2) includes a wall (8) for closing off its internal space.

14. Device according to claim 1, wherein said rings (4, 5) have a surface treatment thereon.

15. Device according to claim 14, wherein said surface treatment is a coating of pure nickel.

16. Device according to claim 1, wherein the portion of said second sleeve (3) which is between said rings (4, 5) is coated with an elastic coating.

17. Device according to claim 16, wherein said elastic coating includes at least one of an elastomer, polyurethane, and tetrafluoroethylene.

18. A method for repairing a damaged area of a tube (1, 1'), comprising:

sliding a device as claimed in claim 1 over the tube (1, 1') such that the second sleeve (3) is adjacent the damaged area of tube injecting a pressurized fluid between the first sleeve (2) and the second sleeve (3).

19. A method for closing off a tube (1, 1'), comprising:

providing a device according to claim 1 in which the first sleeve (2) includes a wall (8) for closing off its internal space;

inserting said device into the tube (1, 1'); and injecting a pressurized fluid between the first sleeve (2) and the second sleeve (3).

\* \* \* \* \*